(12) United States Patent
Flournoy et al.

(10) Patent No.: US 7,425,705 B2
(45) Date of Patent: Sep. 16, 2008

(54) THERMOLUMINESCENT READER SYSTEM

(75) Inventors: James T. Flournoy, Huntsville, AL (US); William S. Harris, Jr., Madison, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 365 days.

(21) Appl. No.: 11/017,539

(22) Filed: Dec. 20, 2004

(65) Prior Publication Data

US 2006/0131498 A1 Jun. 22, 2006

(51) Int. Cl.
*G01T 1/11* (2006.01)
(52) U.S. Cl. .................................. 250/337
(58) Field of Classification Search ........... 250/337
See application file for complete search history.

(56) References Cited

U.S. PATENT DOCUMENTS

| | | | |
|---|---|---|---|
| 3,582,652 A * | 6/1971 | McCall .................. 250/484.3 |
| 3,790,784 A * | 2/1974 | Webb et al. ............... 250/337 |
| 3,809,901 A * | 5/1974 | Szalanczy et al. ......... 250/337 |
| 4,204,119 A * | 5/1980 | Yasuno et al. ............. 250/337 |
| 4,480,189 A * | 10/1984 | Miyake et al. ............ 250/337 |
| 4,727,253 A | 2/1988 | Bruml et al. |
| 4,835,388 A | 5/1989 | Bruml et al. |
| 5,015,855 A * | 5/1991 | Braunlich et al. ........... 250/337 |
| 5,065,031 A * | 11/1991 | Moscovitch ............. 250/486.1 |
| 5,089,749 A | 2/1992 | Cadogan |
| 5,091,653 A * | 2/1992 | Creager et al. ............ 250/484.5 |
| 5,124,993 A * | 6/1992 | Braunlich et al. ............. 372/31 |
| 5,179,281 A | 1/1993 | Tawil et al. |
| 5,311,611 A * | 5/1994 | Migliaccio .................. 385/120 |
| 5,606,163 A * | 2/1997 | Huston et al. ............... 250/337 |
| 6,005,231 A | 12/1999 | Lanovich et al. |
| 2003/0223131 A1 * | 12/2003 | Kuczynski ................... 359/819 |
| 2006/0043314 A1 * | 3/2006 | Katzir et al. ............. 250/484.5 |
| 2006/0050766 A1 * | 3/2006 | Hollander et al. ........... 374/121 |

OTHER PUBLICATIONS

Sade et al., Fiber-Optic radiometer for accurate temperature meaurements Apr. 1, 2002, Applied Optics, vol. 41, No. 10, pp. 1908-1914.*

* cited by examiner

*Primary Examiner*—David P. Porta
*Assistant Examiner*—Djura Malevic
(74) *Attorney, Agent, or Firm*—Michael K. Gray

(57) ABSTRACT

A TLD reader system has a laser diode that heats a thermoluminescent material causing a hemispherical photon emission that is collected by a ball lens. A filter ensures the ball lens receives and collects a predetermined transmittance value of the photons emitted within a predetermined range of wavelength. The ball lens sends the collected photons via a fiber-optic connection to a detection module. An infrared sensor senses the temperature and monitors the heating profile of the thermoluminescent material. A computer-controlled feedback loop maintains a constant output power from the laser diode.

35 Claims, 3 Drawing Sheets

THERMOLUMINESCENT READER SYSTEM

The invention described herein may be manufactured, used and licensed by or for the U.S. Government for governmental purposes without the payment of any royalties thereon.

BACKGROUND OF THE INVENTION

1. Field of the Invention

The present invention pertains to devices that measure the quantity of radiation to which an entity has been exposed. More particularly the present invention pertains to a reading system for ascertaining the amount of radiation received by a thermoluminescent material. Thermoluminescent materials are materials which emit light upon being heated.

2. Discussion of the Background

By providing an individual or object with a thermoluminescent (TL) material, e.g., a badge containing a TL material, the radiation exposure of the individual or object can be determined. When TL materials are exposed to a source of ionizing radiation, electrons are freed. The release of the emancipated electrons results in positive charges remaining in the TL material. Thereafter, if the exposed TL material is heated, recombination occurs.

During recombination, the positive, trapped holes are freed and photons are released. The level of radiation exposure, i.e., the radiation dose, is proportional to the number of photons released by the TL material during the heating process. By determining the number of photons released from the TL material, the level of radiation exposure can be determined.

In environments where individuals are exposed to radiation, for example, the medical and nuclear power industries, it is common practice for personnel to wear radiation badges for the purpose of determining the level of radiation exposure. By providing the badges with a thermoluminescent material and by collecting and reading the respective badges, it is possible to determine the dose of radiation to which an individual has been exposed.

Such badges are technically known as thermoluminescent dosimeter (TLD) badges. TLD badges are periodically collected and read to determine the amount of radiation exposure.

The Army Primary Standards Laboratory (APSL) processes over 100,000 thermoluminescent dosimeter (TLD) badges per year. In addition, the APSL has maintained National Voluntary Laboratory Accreditation Program (NVLAP) certification using TLD badges and readers since 1986. Over the years the APSL has noted a number of short comings in the performance of TLD readers. Some of the problems include measurement variation between readers, an inadequate badge temperature monitoring system, the requirement to operate in the frequency counting mode at high radiation levels, and variations in energy levels used to heat the badge elements.

Prior art systems typically use heat lamps or high temperature compressed gas to heat TLD badge elements. Both techniques are plagued by heating profile problems as well as the inability to stabilize the output of the heating source. Both heat lamp and compressed gas systems require photon counting at low radiation levels and frequency counting at higher radiation levels resulting in significant non-linearity problems. The resultant saturation of photons at higher energy levels has created significant signal interpretation problems in prior art systems.

Concerns with non-uniform heating and temperature control in TLD reader designs have necessitated the frequent use of quality control measures and the development of complex algorithms in an attempt to rectify inherent design shortcomings.

A prior art system currently utilized is demonstrated in FIG. 1. The prior art system uses the output of a tungsten lamp 10 modified by a silicon filter 12 to heat the TL materials or badge elements 14. Four circular badge elements are demonstrated in FIG. 1. These elements are heated for purposes of determining radiation exposure.

The output spectrum for the tungsten lamp 10 is continuous from about 250 to 3000 nanometers (nm). The peak spectral output for the lamp depends on the operating current and voltage. The peak emission for the tungsten lamp 10 is in the 850 to 1000 nanometer (nm) region. The silicon filter 12 allows radiation at wavelengths of greater thean 1000 nm to be transmitted and used to heat the badge elements. The silicon filter has a peak transmittance of about 91% at 1500 nm and the transmission steadily drops off until it is only about 65% at 3000 nm.

The lamp power of the prior art system is allowed to vary by as much as ±20% from a defined reference value before an error message is generated and the reader is stopped.

A flux sensor (not shown) is mounted in the lamp housing. The output from the flux sensor is used to infer the temperature of the badge elements 14, which as a result of the TL material of which they are composed, function as dosimeter elements. The photons emitted by the badge elements pass through a blue filter (not shown) which is located at the front of the photomultiplier tube (PMT) 30.

The blue filter has a peak transmittance of about 68% at 397 nm and has a full width at half maximum (FWHM) of 122 nm. $Li_2B_4O_7$:Cu badge elements have a peak photon emission at 370 nm with a FWHM of 60 nm, while $CaSO_4$:Tm badge elements have a peak photon emission at 442 nm with a FWHM of 35 nm.

The prior art system (FIG. 1) uses a PMT having a spectral response of 300 to 650 nm. The high voltage for the PMT is allowed to vary by as much as ±5% from a defined reference value before an error message is generated and the reader is stopped.

With reference to FIG. 1, the prior art TLD reader system includes a magazine 18 which holds the radiation badges or dosimeter holders 20 that contain badge elements 14. An automated slide 22 is used to extract element plates 24 which contain TL materials or elements from each respective badge 20 stored in magazine 18. Slide 22 is provided with a reference aperture 26. An ID code reading unit 28 identifies the individual associated with each respective badge.

Upon the badge elements 14 being heated, photons are emitted from the TL material and are filtered by the blue filter (not shown) before proceeding to the photomultiplier tube PMT 30. A CPU (not shown) connected to PMT 30 processes the collected information.

FIG. 2A, FIG. 2B, FIG. 2C and FIG. 2D demonstrate the number of hits, i.e., number of photons detected, as a function of time for the prior art system of FIG. 1. FIG. 1 depicts four TL badge elements 14 which are associated with each radiation badge or dosimeter holder 20, the badge elements being positioned on the element plate 24. Two of these badge elements are $Li_2B_4O_7$:Cu badge elements and two of the badge elements are $CaSO_4$:Tm badge elements. FIGS. 2a and FIGS. 2b graphically represent hits as a function of time for the two respective $Li_2B_4O_7$:Cu badge elements, and FIG. 2c and FIG. 2d represent hits as a function of time for the two respective $CaSO_4$:Tm badge elements.

A number of problems have been recognized with the prior art TLD reader system of FIG. 1. The tungsten lamp used as the heating mechanism, in conjunction with the silicon filter, is inefficient resulting in a considerable amount of wasted heat. In addition the allowed tolerances in lamp power lead to variations in the heating profiles of the badge elements, and the use of the flux sensor has proven unreliable in determining the temperature of badge elements.

Another area of concern is the transmission characteristics of the blue filter. The blue filter's transmission range is too narrow to cover the emission peaks of badge elements, especially in the case of $Li_2B_4O_7$:Cu badge elements.

Still further, in that the emission of badge elements is hemispherical in nature, the emission geometry of the emitted photons has not been properly taken into account in the design of prior art photon collectors. The result has been significant signal loss and inefficiency.

The non-linearity and saturation characteristics of the PMT force the prior art TLD readers to be operated in both the photon and frequency counting modes. Operation in the frequency counting mode results in a reduction in measurement accuracy.

For example, the PMT used in the prior art system when operating at high voltage levels allows high tolerances in the signals processed. These high tolerances, associated with the frequency counting mode, equate to gain variations which approach a factor of nearly 2.6.

Due to the close proximity of the badge elements to both the silicon filter and the blue filter, the filters must be cleaned on a regular basis to avoid serious system performance problems.

Further, the prior art optical design is not hardened for purposes of field operations and would be unlikely to be able to support deployable missions.

SUMMARY OF THE INVENTION

Accordingly, one object of the present invention is to provide a TLD reader system that realizes consistent and accurate reader performance;

Another object of the present invention is to provide a TLD reader system which is linear.

Still another object of the present invention is to provide a TLD reader system which allows for a hardened solid state design so as to be reliable and durable in field operations.

These and other objects are achieved by providing a TLD reader system having a laser diode for heating a thermoluminescent material. A ball lens collects the hemispherical photon emissions as a result of the laser diode heating the thermoluminescent material. A filter is provided to ensure the ball lens receives a predetermined transmittance value of the photons emitted from the thermoluminescent material within a predetermined range of wavelength.

An infrared sensor senses the temperature of the thermoluminescent material and monitors the heating profile of the thermoluminescent material. The infrared sensor is connected to a CPU. The infrared sensor operates in a different waveband than the emission spectrum of the laser diode so as to prevent signal distortion.

By heating the thermoluminescent material by a laser beam generated by the laser diode, photons are emitted. These emitted photons are first filtered by the filter and then collected by the ball lens which sends the collected photons via a fiber-optic connection to a detection module.

A splitter is fiber connected to the laser diode and splits a predetermined percentage of output from the laser diode and directs the predetermined percentage of output toward the thermoluminescent material. A monitor detector or evaluation unit receives a remaining predetermined percentage of the output from the laser diode so as to monitor and evaluate fluctuations in the output of the laser diode.

The monitor detector is connected to a computer that is a part of a computer-controlled feedback loop for maintaining a constant output power from the laser diode.

A power source is provided to adjust the power supplied to the laser diode, the power source receives control signals from the monitor so as to be able to adjust the power of the laser diode so that a constant output power is maintained.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
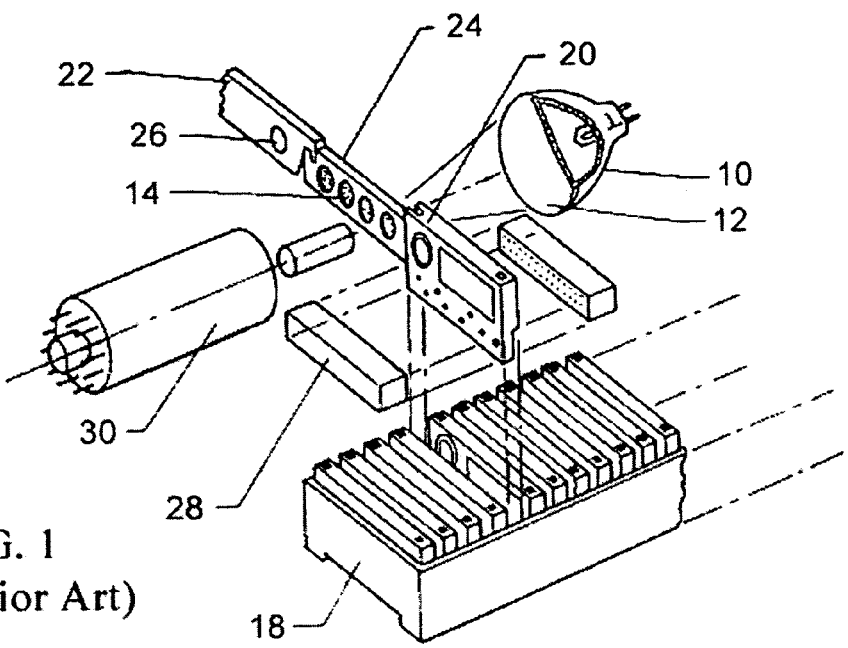
FIG. 1 is a schematic drawing of a prior art TLD reader system.
Figure 2A:
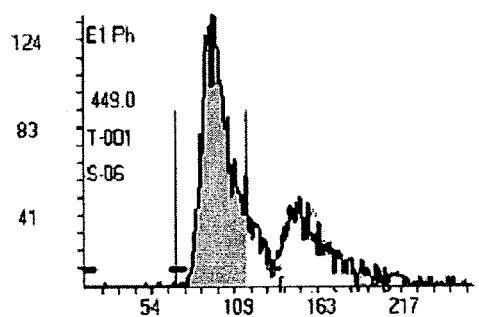
FIGS. 2A, 2B, 2C and 2D graphically illustrate the number of photons detected as a function of time in the respective TL elements shown in prior art FIG. 1.
Figure 2B:
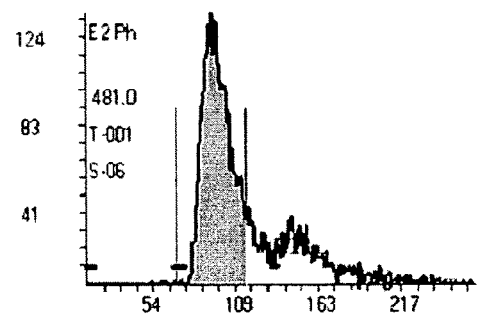
Figure 2C:
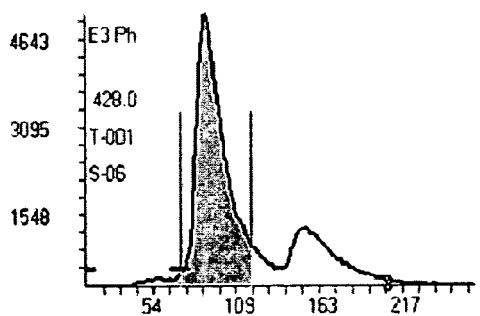
Figure 2D:
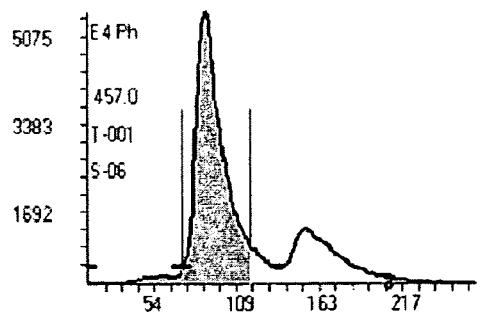
Figure 3:
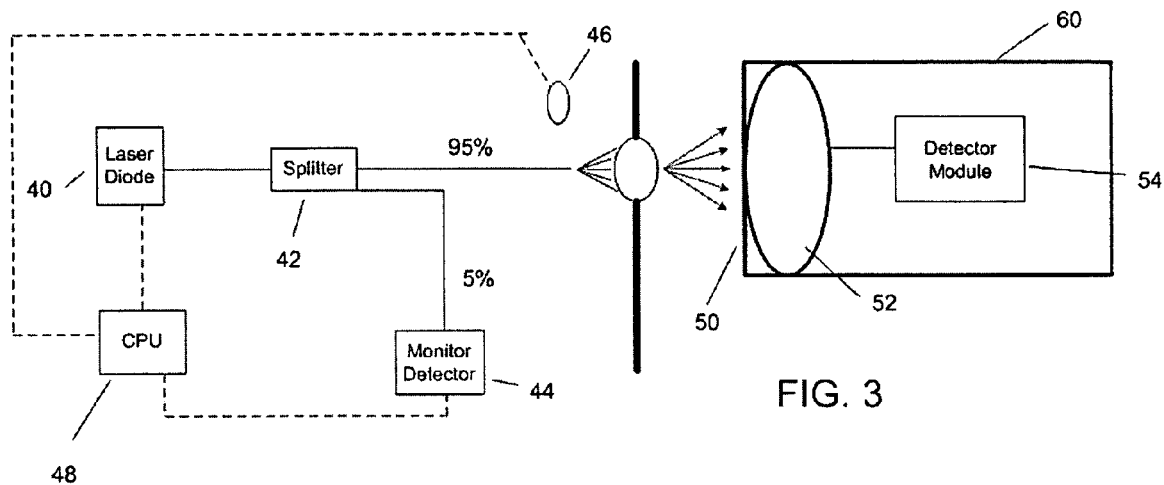
FIG. 3 is a schematic drawing of the TLD reader system of the present invention.
Figure 5:
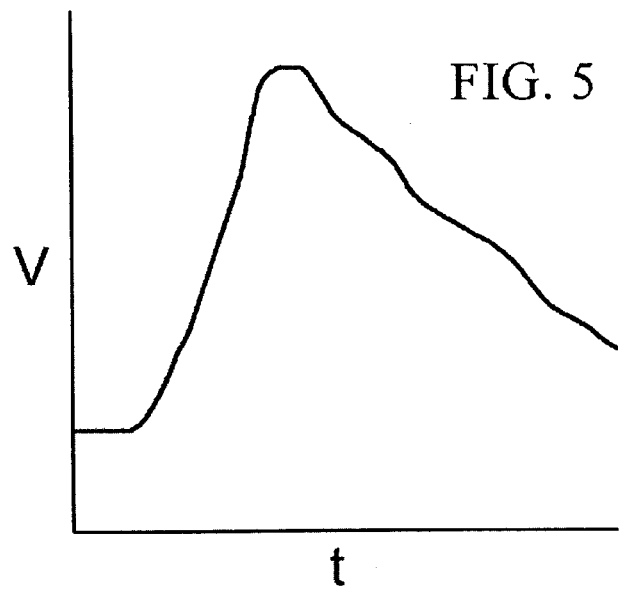
FIG. 5 is a graphical illustration demonstrating the general shape of the voltage of the infrared sensor of the present invention as a function of time.

Referring now to the drawing wherein like numbers represent like parts in each of the several figures, FIG. 3 demonstrates a fiber pigtailed laser diode 40 connected by fiber cable to a splitter 42. The splitter 42 directs a predetermined percentage of the power from the laser diode 40 to heat a TL material or badge element 14 while a remaining percentage of power is channeled to a monitor detector or evaluation un An infrared sensor 46 is connected to CPU 48. The infrared sensor 46 monitors the badge TL element 14 substrate temperature to ensure that all badge elements are heated to the same temperature. In so doing, the infrared sensor effectively helps to ensure a uniform heating profile of the badge elements. The analog output (mV/DEG C) from the infrared sensor is correlated by the CPU 48 with individual badge elements so that changes in the badge element correction factors can be evaluated. The infrared sensor is selected to have a field a view which is sufficiently large to monitor the back surface temperature of the TL badge elements. The infrared sensor is capable of covering a temperature range of from 50 to 400 degrees C. and has a time constant of less than 160 ms. FIG. 5 graphs the general shape of the voltage of the infrared sensor as a function of time.

Upon a badge element 14 being heated, photons are emitted from the badge element with the photons proceeding to filter 50. The filter 50 is a thin filter made of Schott KG3 glass or the equivalent for purposes of realizing transmittance values of greater than 80% from 355 to 500 nm while ensuring a transmittance of less than 0.4% for all wavelengths beyond 950 nm.

Upon passing through the filter 50, the photons are collected by a ball lens 52 having a numerical aperture large enough to capture the hemispherical photon emission from the badge elements. The ball lens is made out of ultraviolet-grade fused silica to ensure transmittance values of greater than 90% for wavelengths in the 355 to 500 nm range. The filter 50 and ball lens 52 are mounted parallel and in very close proximity to one another with the ball lens being fiber-optically connected to a detection module 54.

The detection module upon receiving the output from the ball lens, sends a signal to the CPU 48 which tabulates and stores the information relating to each individual radiation badge.

As was stated, a predetermined percentage of output from laser diode 40 is supplied from the splitter 42 to the TL elements with a remaining percentage being directed to the monitor detector 44. Thus, if the badge elements were to receive 95% of the output power of the laser diode from the splitter 42, the monitor detector would receive 5% of the output power thus achieving a 95/5 ratio for such a fiber splitter. Splitter devices are available with a variety of different splitter ratios.

Figure 4:
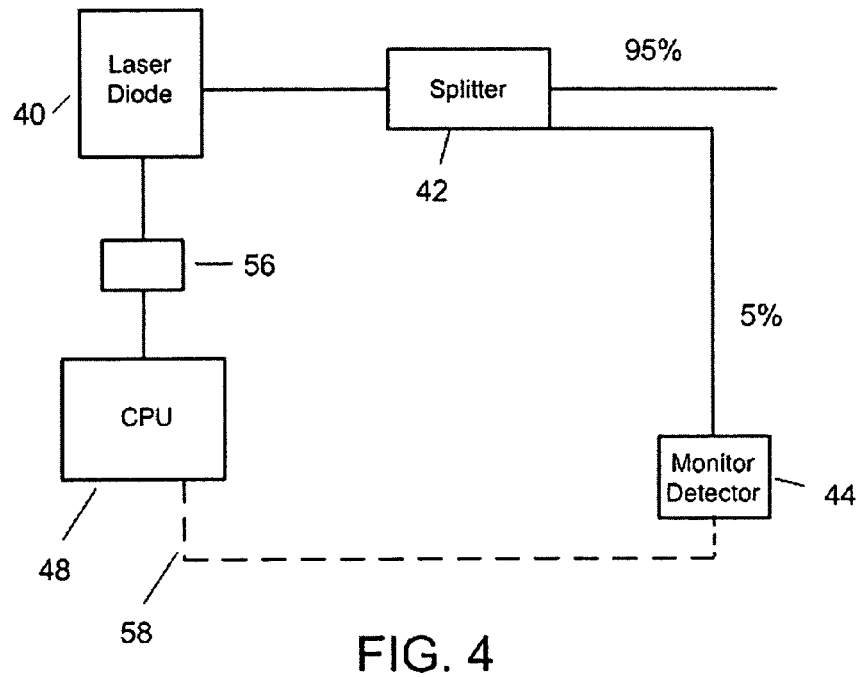
FIG. 4 is a schematic drawing demonstrating the computer-controlled power feedback system according to the present invention.

As demonstrated in FIG. 4, the monitor detector 44 connects to CPU 48 for purposes of forming a computer-controlled feedback loop. A power source 56 receives signals from CPU 48 which, based upon the received signals, supplies the laser diode with the requisite power so that a constant output power from the laser diode is realized.

The output of the monitor detector 44 is evaluated in real time by CPU 48 so as to quickly adjust the drive current of the laser diode. The quantity of drive current is supplied by power source 56 which supplies the necessary amount of direct current to the laser diode.

The computer-controlled feedback loop 58 provided by the connections between the laser diode 40, splitter 42, evaluation unit 44, power source 56 and CPU 48 allow the output of the laser diode to remain at a desired constant level.

Figure 6:
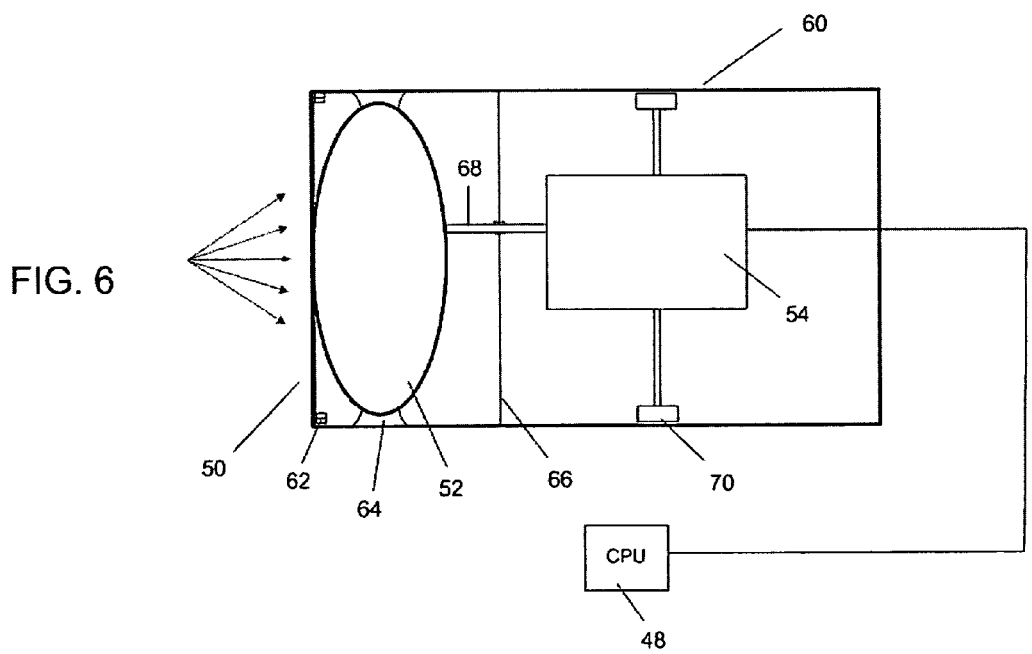
FIG. 6 is a schematic illustration of the thermoluminescent reader module according to the present invention.

With reference to FIG. 6, a casing 60 is provided for housing the filter 50, ball lens 52 and detection module 54. Casing 60, filter 50, ball lens 52 and detection module 54 constitute a thermoluminescent reader module 80. The casing is made of aluminum or such material that provides durability for protecting the internal contents and shields the detection module 54 from unwanted reflections emanating from the laser diode. The filter 50 is affixed at the front of the casing by a machined retaining ring 62. The ball lens 52 is mounted in parallel to the filter 50 by an optical mount 64. Plastic mounting brackets 66 support fiber optic cable 68 which connects the ball lens 52 to detection module 54. Mounting brackets 70 affix and stabilize the detection module 54 within the casing 60. The detection module 54 is a silicon avalanche photodiode (APD) such as the single photon counting module manufactured by Perkin-Elmer.

In that the laser diode has a much faster rise time than the prior art heating elements not only the accuracy but the speed at which TL elements are processed will be enhanced by the present invention. Further, in that the present invention is applied to solid-state technology, the present invention may be safely deployed in field operations.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A TLD reader system, comprising:
   a laser diode for heating a thermoluminescent material;
   a ball lens for collecting hemispherical photon emissions as a result of said diode heating said thermoluminescent material; and
   an infrared sensor for sensing the temperature and monitoring the heating profile of the thermoluminescent material.

2. A TLD reader system according to claim 1, wherein said infrared sensor operates in a different waveband then the emission spectrum of said laser diode.

3. A TLD reader system according to claim 1, further comprising a detector, said detector being fiber-optically coupled to said ball lens.

4. A TLD reader system according to claim 3, further comprising:
   a filter for ensuring said ball lens receives a predetermined transmittance value of the photons emitted from the thermoluminescent material within a predetermined range of wavelength.

5. A TLD reader system according to claim 4, further comprising:
   a splitter coupled to said laser diode and directing a predetermined percentage of an output from said laser diode toward the luminescent material.

6. A TLD reader system according to claim 5, further comprising a monitor detector for receiving a remaining predetermined percentage of the output from said diode so as to monitor fluctuations in the output of said diode, said monitor detector being connected to said splitter.

7. A TLD reader system according to claim 6, further comprising:
   a CPU connected to said monitor detector and to said laser diode so as to form a computer-controlled feedback loop for maintaining a constant output power from said laser diode.

8. A TLD reader system according to claim 7, further comprising:
   a power source having means for adjusting the power supplied to said laser diode, said power source being connected to said monitor detector.

9. A TLD reader system according to claim 7, wherein said filter, said ball lens and said detector are provided in a hardened module.

10. A TLD reader system, comprising:
    a laser diode for heating a thermoluminescent material;
    an infrared sensor for sensing a temperature and monitoring a heating profile of the thermoluminescent material;
    a ball lens;
    a filter positioned between said laser diode and said ball lens;
    detection means for detecting photons passing through said filter; and
    wherein said laser diode and said infrared sensor are connected to a feedback loop.

11. A TLD reader system according to claim 10, further comprising:
    a splitter coupled to paid laser diode for directing a predetermined percentage of output from said laser diode to the thermoluminescent material, said splitter being a part of said feedback loop.

12. A TLD reader system according to claim 11, further comprising:
    an evaluation unit for evaluating the output of said diode in real time, said evaluation unit receiving a remaining predetermined percentage of the output from said laser diode so as to detect and evaluate fluctuations in the output of said laser diode, said evaluation unit being connected to said splitter, said evaluation unit being included in said feedback loop.

13. A TLD reader system according to claim 12, further comprising:

a power source connected to said laser diode, said power source receiving corrective signals, as needed, from said evaluation unit.

14. A TLD reader system according to claim 10, further comprising:
a splitter connected to said laser diode, said splitter directing a predetermined percentage of output from said laser diode toward the thermoluminescent material.

15. A TLD reader system according to claim 14, further comprising:
an evaluation unit for receiving a remaining percentage of output from said laser diode from said splitter.

16. A TLD reader system according to claim 15, further comprising:
a CPU connected to said laser diode and to said evaluation unit.

17. A TLD reader system according to claim 16, wherein: said infrared sensor is connected to said CPU.

18. A TLD reader system according to claim 14, wherein said laser diode and said splitter are fiber coupled.

19. A method for determining the radiation exposure of a thermoluminescent material, comprising the steps of:
applying a laser beam to heat the thermoluminescent material;
using an infrared sensor for directly monitoring the temperature and heating profile of the thermoluminescent material;
using a ball lens for collecting the photons emitted from the heated thermoluminescent material;
determining the number of photons emitted and calculating the dose of radiation exposure of the thermoluminescent material.

20. A method according to claim 19, wherein: the laser beam is provided by a laser diode.

21. A TLD reader system, comprising:
a laser source for directing a laser beam to a splitter, said splitter directing a portion of the laser beam to a thermoluminescent material, said laser source and said splitter being included in a feedback loop;
an infrared sensor for sensing a temperature and monitoring a heating profile of the thermoluminescent material, said sensor being connected to said feedback loop.
a casing having an opening for axial alignment with the thermoluminescent material, the opening allowing photons emitted from the thermoluminescent material to enter said casing;
a filter positioned at the opening of said casing;
a ball lens positioned within the casing which, as a result of said filter, receives a predetermined transmittance value of the photons emitted from the thermoluminescent material within a predetermined range of wavelength;
a detector positioned within said casing and optically connected to said lens, said lens being positioned between said filter and said detector.

22. A TLD reader system according to claim 21, wherein: said ball lens captures hemispherical photon emissions.

23. A TLD reader system according to claim 22, wherein: said laser source is a laser diode.

24. A TLD reader system according to claim 23, wherein: the photons emanating from the thermoluminescent material propagate in a wireless manner to said filter at the opening of said casing.

25. A TLD reader system according to claim 24, further comprising:
a monitor detector for receiving a remaining portion of the laser beam from said splitter, said monitor detector being included in said feedback loop.

26. A TLD reader system according to claim 25, further comprising a CPU connected to said monitor detector, said CPU being included in said feedback loop.

27. A TLD reader system according to claim 26, wherein: a fiber optic cable directly connects said ball lens to said detector.

28. A TLD reader system according to claim 26, further comprising:
a power source connecting to said CPU and to said laser diode.

29. A TLD reader system according to claim 26, wherein: said detector connected to said ball lens in said casing comprises an avalanche photodiode.

30. A TLD reader system according to claim 22, wherein: a fiber optic cable directly connects said ball lens to said detector.

31. A TLD reader system, comprising:
a laser for heating a thermoluminescent material of a given TL badge in a sample of TL badge elements;
an infrared sensor for sensing a temperature and monitoring a heating profile of the thermoluminescent material of said given TL badge;
a ball lens;
a filter optically aligned with said lens; and
detection means for detecting photons passing through said filter and said lens, said photons being emitted from the thermoluminescent material as a result of the laser heating the thermoluminescent material; and
wherein said laser diode and said infrared sensor are connected to a feedback loop.

32. A TLD reader system according to claim 31, wherein: said laser is a laser diode.

33. A TLD reader system according to claim 32, wherein: said ball lens is positioned between said filter and said detection means with said ball lens being directly coupled by a fiber optic connector to said detection means.

34. A TLD reader system according to claim 33, wherein: said detection means comprises an avalanche photodiode.

35. A TLD reader system according to claim 31, wherein: said infrared sensor and said feedback loop ensure each thermoluminescent material in each TL badge in said sample will be heated to an identical temperature level.

* * * * *